UNITED STATES PATENT OFFICE.

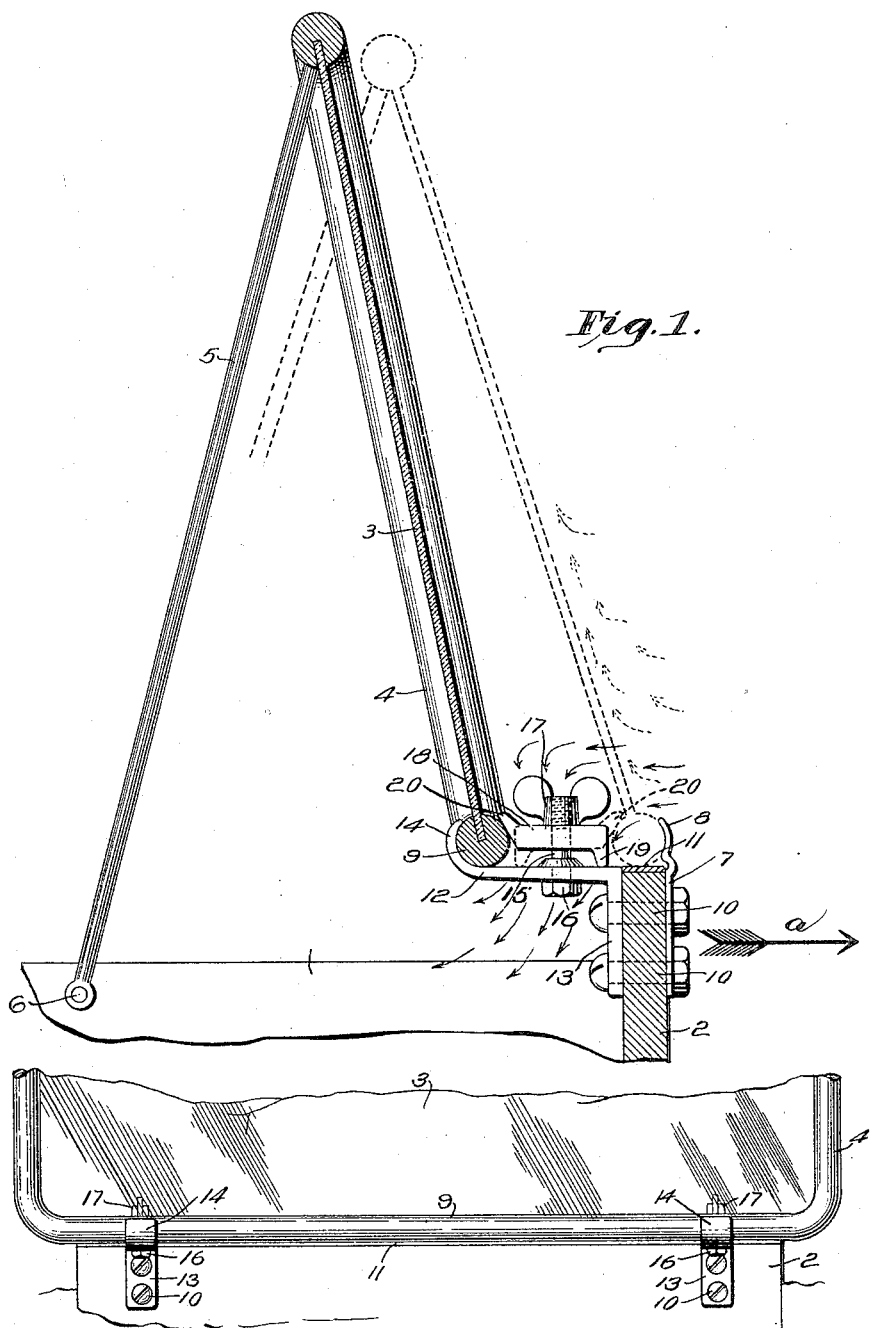

WALTER F. ROPER, OF HOPEDALE, MASSACHUSETTS.

WIND-SHIELD-ADJUSTING DEVICE.

1,106,892.  Specification of Letters Patent. Patented Aug. 11, 1914.

Application filed July 25, 1913. Serial No. 781,094.

*To all whom it may concern:*

Be it known that I, WALTER F. ROPER, a citizen of the United States, residing at Hopedale, county of Worcester, and State of Massachusetts, have invented an Improvement in Wind-Shield-Adjusting Devices, of which the following description, in connection with the accompanying drawings, is a specification, like letters on the drawings representing like parts.

The invention to be hereinafter described relates to wind-shields for automobiles and the like, and more particularly to the means for adjusting and holding the wind-shield in different positions.

As well understood by those skilled in the art, it is desirable at times to adjust and hold the wind-shield in closed position such that it will properly protect those in the machine, and at other times to adjust and hold it so that an adequate circulation of air may pass the shield into the space behind the dash.

With these generally-stated facts in view, the aims and purposes of the present invention are to provide a simple, economically constructed, and efficient means for holding the wind-shield in either a closed or ventilating position, and wherein the character of such means is such that it can be readily secured in operative position, all as will more fully appear by the following description in connection with the accompanying drawings showing one form of embodiment of the invention, it being understood that the true scope of the actual invention is defined by the claims.

In the drawings:—Figure 1 is a side elevation and part sectional view of the present invention associated with a wind-shield and showing by full lines the relation of parts when the wind-shield is held in ventilating position, and by dotted lines the relation of parts when the wind-shield is held in closed or non-ventilating position; and Fig. 2 is a view of the parts shown by Fig. 1, looking from the driver's seat or from the rear of the automobile.

In connection with the present invention, the particular form or character of the wind-shield may be made suitable to the intended purpose which is to offer a shield against wind and weather as the automobile moves over the road in the direction of the arrow, Fig. 1, and to be adjustable to a ventilating position to permit air currents to pass the lower portion of the wind-shield into the space back of the dash. This adjustability of the wind-shield in automobiles is well-understood as being a desirable feature on account of the heat developed by the engine and transmitted to the space immediately back of the dash; and various means have been provided for effecting such adjustability of the wind-shield. These prior constructions, however, have been either complicated in the mechanism employed, expensive of manufacture and application, or have not fulfilled the intended purpose to entire satisfaction.

As represented in the accompanying drawings, the automobile or vehicle 1 may be of any usual or desired character, and so also may be the dash 2. The wind-shield represented in connection with the present form of the invention comprises a glass panel 3 and the metal bead or rim 4, and the upper portion of the wind-shield may be appropriately supported as by a brace or rod 5 pivoted at 6 to a convenient part of the automobile, the construction being such that the wind-shield may be movable from the full to the dotted line position indicated in Fig. 1.

As well understood by those skilled in the art, any means that shall be employed to hold a wind-shield, whether in closed or ventilated position, must be positive and firm in its action, owing to the continued vibration to which the automobile and, perforce, the wind-shield are subjected during use. At the same time, it is of importance that such means be capable of easy application and removal, and that it be cheap of manufacture.

Secured to and projecting up from the dash 2 is the stop 7, the upper portion 8 of which is preferably rounded or otherwise shaped to conform to the general contour of the lower frame member 9 of the wind-shield, the construction being such that when the wind-shield is moved to cause the frame member 9 to bear against the end 8 of the stop 7, the parts shall have a proper bearing contact. In the present form of the invention, the stop 7 is placed upon the front of the dash, and preferably there are two of such stops, one near the opposite sides of the dash, although, of course, any number of said stops may be employed. Likewise these stops may be appropriately secured to the dash by any suitable means, but in the present form of the invention they are fastened to the dash by the bolts 10, which are also employed for securing the ventilating brackets in place, as will presently appear.

In order to prevent rattling of parts or noise during operation of the machine, there is preferably employed upon the top portion of the dash 2, a cushion 11 which may be of any material such as rubber or felt.

Secured to the rear face of the dash 2 are the ventilating brackets 12, preferably two in number, as indicated by Fig. 2, one being secured to the dash near either end thereof, but obviously any number of these brackets may be employed. The ventilating brackets 12 comprise the securing arm 13 which is engaged by the through bolts 10 and the horizontal arm terminating at its rear portion in the seat 14, preferably made to conform to the contour of the lower frame member 9 of the wind-shield. The character of the horizontal arms of the ventilating brackets may be varied, of course, the construction being such that when the wind-shield is moved into full line position indicated as by Fig. 1, and then held by the means hereinafter described, a suitable ventilating space shall be provided between the lower portion of the wind-shield and the dash 2, to permit currents of air to pass into the space immediately back of the dash, as indicated by the full line arrows, Fig. 1.

As hereinbefore noted, it is necessary to securely hold the wind-shield in position, both when it is in closed and when in ventilating relation to the other parts, and the present invention contemplates wedge means to this end, as will now be described.

Each of the ventilating brackets 12 has its horizontal arm perforated for the passage of a bolt 15, Fig. 1, the head 16 of which preferably bears upon the lower surface of the horizontal arms of such bracket, and the upper end of which is screw-threaded to engage the interior screw thread of a suitable winged or clamping nut 17, as clearly indicated in Fig. 1.

The wedge means contemplated by the present invention for holding the wind-shield in either closed or ventilating position, is shown by the full lines in Fig. 1 as holding the wind-shield in the latter position, and comprises a body portion 18 having a toe 19 adapted to rest upon the upper surface of the ventilating bracket 12, and a wedge end 20, the inclined surface of which is adapted to bear upon the frame member 9 of the wind-shield, the construction being such that the wedge may have the inclined or wedge end 20 clamped tightly upon the lower frame member of the wind-shield by means of the winged nut 17 and the clamping bolt 15, as hereinbefore noted, so that the wind-shield shall be securely fastened in ventilating position, or the wedge may be reversed into the dotted line position indicated in Fig. 1, when the wind-shield is moved into its closed position, as represented by the dotted lines in said Fig. 1, so that when thus reversed, the wedge may in a similar manner have its wedge end 20 clamped upon the lower frame member 9 of the wind-shield. The reversible wedge, it will be seen, therefore serves as a simple means for holding the wind-shield either in its closed or ventilating position, and when in closed position, the lower member of the wind-shield is held between the upper portion 8 of the stop 7 and the inclined portion of the wedge end 20 as indicated in Fig. 1, and when in ventilating position, the lower frame member of the wind-shield, as indicated by full lines, Fig. 1, is held between the seat 14 of the ventilating bracket 12 and the inclined or wedge end 20.

From the construction described, as a good, practical form of the present invention, it will be seen that the winged nut 17 and the clamping bolt 15 afford positive and forcible clamping means for holding the reversible wedge in either its full or dotted line position, and that the toe 19 of the wedge, bearing upon the ventilating bracket, while the inclined end 20 has no support other than upon the frame member of the shield, afford a leverage action for the wedge, in this form of the invention, to further increase the clamping and holding effect of the wedge upon the shield.

While the form of reversible wedge shown and described constitutes a convenient and good, practical embodiment of the invention, it is to be understood that the wedge might be modified to some extent or its clamping means be changed within the true scope of the actual invention, which is definitely set forth by the claims.

What is claimed is:—

1. In a device of the character described, the combination of a wind-shield mounted for adjustment to a closed or a ventilating position, means for sustaining the lower member of the wind-shield and a wedge member independent of the wind-shield for clamping the said lower member against said means for holding the wind-shield in either closed or ventilating position.

2. In a device of the character described, the combination of a wind-shield mounted for adjustment to a closed or a ventilating position, means including stops for sustaining the lower member of the wind-shield, and a wedge member independent of the wind-shield and having an inclined end portion for engaging the said lower member and holding the wind-shield against one of said stops in either closed or ventilating position.

3. In a device of the character described, the combination of a wind-shield mounted for adjustment to a closed or a ventilating position, stops or seats against which the lower member of the wind-shield bears when in either of said positions, a wedge independent of the wind-shield, and means for clamping the wedge against the lower member of the wind-shield to hold said shield in either its closed or ventilating position.

4. In a device of the character described, the combination of a wind-shield mounted for adjustment to a closed or a ventilating position, stops or seats against which the lower member of the wind-shield bears when in either of said positions, a reversible wedge independent of the wind-shield, and means for clamping the wedge against the lower member of the wind-shield to hold said shield in either its closed or ventilating position.

5. A device for holding a wind-shield in closed or ventilating position, comprising stops and a reversible wedge, means for supporting the wedge between the ventilating and closed positions of the wind-shield, and means for clamping the wedge against the wind-shield in either of its two positions to hold the wind-shield either open or closed.

6. A device of the character described, comprising a wedge, a stop at either side of said wedge adapted to be engaged by the lower member of a wind-shield, and means for clamping the wedge in place to cause its inclined or wedge portion to clamp the lower member of said wind-shield between it and either of said stops.

7. In an automobile or other vehicle, a wind-shield adjustable to closed and ventilating positions, stops defining the closed and ventilating positions of the wind-shield, a reversible wedge disposed between said stops and having an inclined or wedge end portion, and a clamping bolt and nut for forcing the inclined end portion against the lower frame member of said wind-shield to hold the same against one of said stops in either closed or ventilating positions.

8. A device of the character described, comprising the ventilating brackets 12, stops 8 and 14, a wedge member between said stops and comprising a body portion 18 and an inclined end portion 20, a bolt 15 having a head 16 and a screw-threaded end portion, said bolt adapted to pass through said bracket 12 and wedge, and a nut 17 for engaging the threaded portion of the bolt.

9. A device of the character described, comprising the ventilating brackets 12, stops 8 and 14, a wedge member between said stops and comprising a body portion 18 and an inclined end portion 20, and an oppositely disposed toe portion 19 to bear against said bracket 12, a bolt 15 having a head 16 and a screw-threaded end portion, said bolt adapted to pass through said bracket 12 and wedge, and a nut 17 for engaging the threaded portion of the bolt.

In testimony whereof, I have signed my name to this specification, in the presence of two subscribing witnesses.

WALTER F. ROPER.

Witnesses:
CLARE H. DRAPER,
WILLIAM O. PERKINS.

---

Copies of this patent may be obtained for five cents each, by addressing the "Commissioner of Patents, Washington, D. C."